Figure 1:
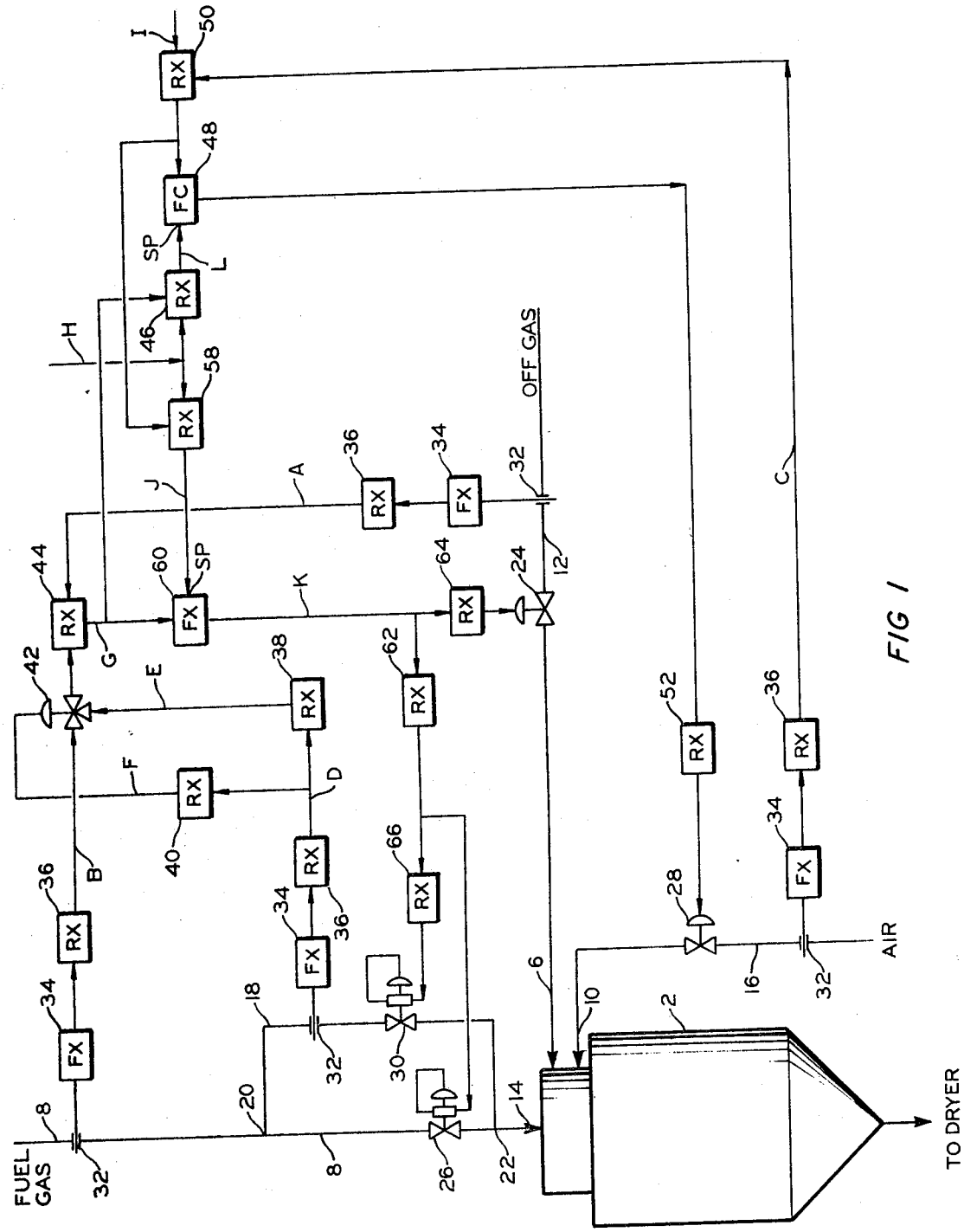

United States Patent [19]
Osburn

[11] 3,722,811
[45] Mar. 27, 1973

[54] METHOD AND APPARATUS FOR CONTROLLING THE FLOW OF MULTIPLE STREAMS

[75] Inventor: Carl L. Osburn, Bartlesville, Okla.

[73] Assignee: Phillips Petroleum Company, Bartlesville, Okla.

[22] Filed: July 13, 1971

[21] Appl. No.: 162,058

[52] U.S. Cl..................236/14, 236/15 E, 431/12
[51] Int. Cl...................................F23n 1/02
[58] Field of Search............236/1 A, 15 E, 15 B, 14; 431/12, 2

[56] References Cited

UNITED STATES PATENTS

| | | |
|---|---|---|
| 3,049,300 | 8/1962 | Lewis et al..................431/12 X |
| 3,602,487 | 8/1971 | Johnson......................431/12 X |
| 3,607,117 | 9/1971 | Shaw..........................43/12 X |

Primary Examiner—William E. Wayner
Attorney—J. Arthur Young et al.

[57] ABSTRACT

A method and apparatus for controlling the flow of first and second fuel streams and an air stream by selectively measuring the second fuel stream in response to the flow rate of said second fuel stream and controllably combining the three streams at rates responsive to a set point signal and a signal responsive to the computed, total, combustible heating value per unit time of the summation of the fuel streams flowing through their respective conduits.

12 Claims, 2 Drawing Figures

Patented March 27, 1973

3,722,811

2 Sheets-Sheet 1

INVENTOR.
C.L OSBURN

BY Young & Quigg

ATTORNEYS

INVENTOR.
C. L. OSBURN
BY Young & Quigg
ATTORNEYS

METHOD AND APPARATUS FOR CONTROLLING THE FLOW OF MULTIPLE STREAMS

In the operation of burners, for example, which utilize first and second fuels, it is often desirable to control the flow of the fuels in a preselected manner and to control the air stream flow rate responsive to the fuel streams for providing efficient combustion of the fuels. In such an operation, especially where the calorific value of the first and second fuels differ widely one from the other, it is often desirable to utilize a larger quantity of a specific one of the fuels. Such a situation can exist, for example in a heating apparatus within a carbon black plant using a fuel gas and a low calorific value off-gas for supplying heat to a pellet dryer and/or to a steam boiler. Since it is desirable to utilize as large a quantity of the off-gas as is possible while maintaining the total combustion heating value of the combined fuel stream, it often occurs that demand for the fuel gas varies over a wide range. Accurate control of these three streams requires accurate measurement of the flow rate of the individual stream and in such an arrangement it has been found that more precise process control can be maintained by improving the measurement of the stream whose flow rate varies widely.

This invention therefore resides in a method and apparatus for controlling the flow rates of first and second fuel streams and an air stream by selectively measuring the second fuel stream in response to the magnitude of the flow rate of said second stream and controllably combining the three streams at rates responsive to a total heat demand set point and a signal that is responsive to the computed, total, combustible heating value per unit time of the summation of the fuel streams flowing through their respective conduits.

Other aspects, objects, and advantages of the present invention will become apparent from a study of the disclosure, the appended claims, and the drawings.

The drawings are diagrammatic views of the apparatus of this invention.

Figure 2:
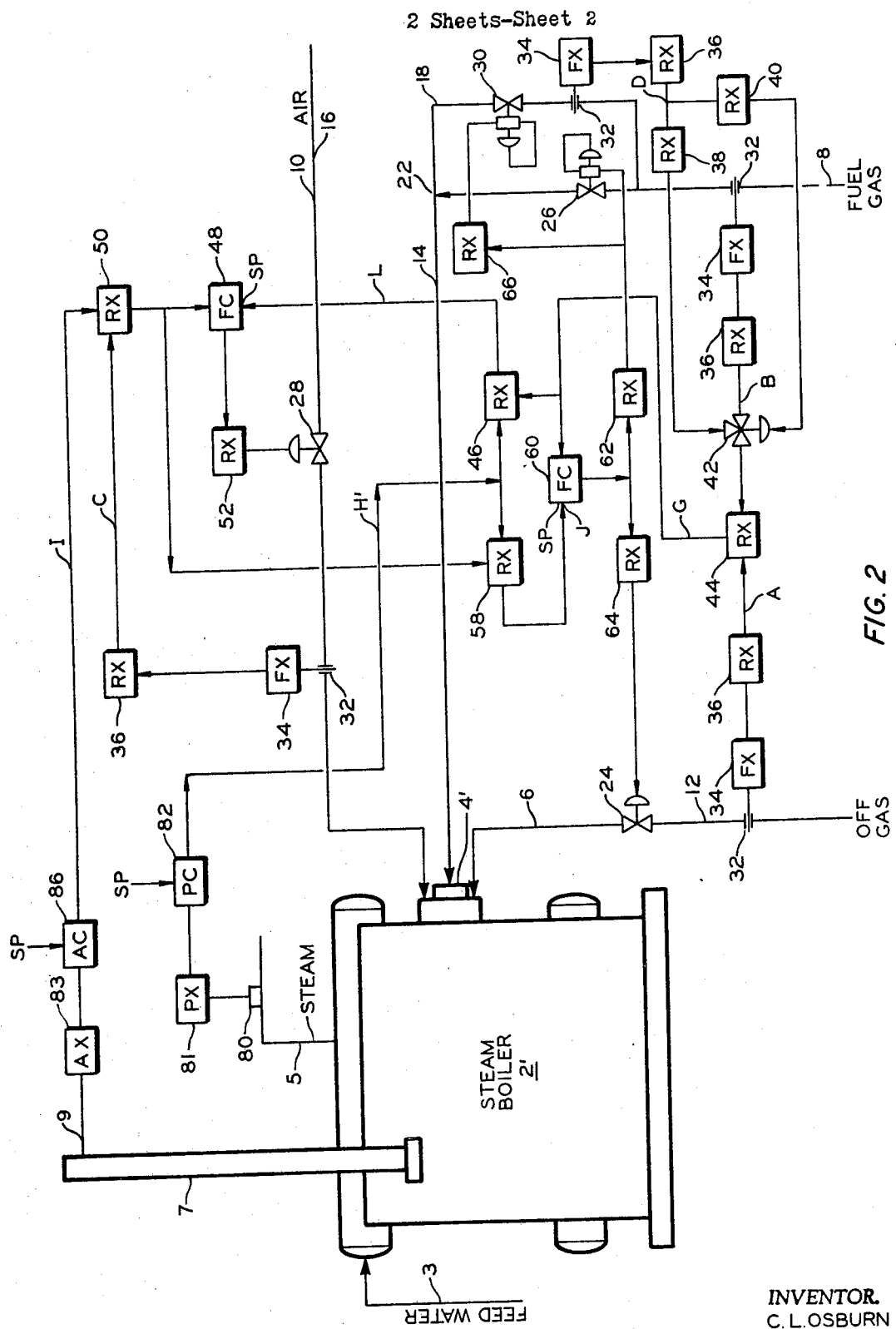

FIG. 1 shows one embodiment of the invention and
FIG. 2 shows another embodiment of the invention.

Referring to FIG. 1, a burner 2 having a fuel section 4, for supplying combustion gases to a dryer for example is operably connected to first, second, and third conduits 6, 8, and 10 for the flow of first and second fuel streams 12, 14 and an air stream 16, respectively, therethrough for combining and combusting said streams. A fourth, or by-pass, conduit 18 having an inlet 20 and an outlet 22 is connected in fluid communication with the second conduit 8 at spaced-apart locations along said second conduit 8. Control valves 26 and 30 respectively are positioned in the second conduit 8 between the inlet 20 and outlet 22 of the fourth conduit 18 and in the fourth conduit 18 for selectively passing the second fuel stream 14 through different flow measuring elements, to be later more fully described.

A separate measuring-signalling means comprising flow measuring element 32, transmitter 34 and square root relay 36 is provided for each of the conduits 6, 8, 10 and 18 for measuring the flow rate therethrough and delivering respective signals A, B, C, and D responsive to the measurement of the flow rate of the streams 12, 14 and 16 passing therethrough. The measuring-signalling means of the second and fourth conduits 8, 18 are of different size and flow capacity one from the other and the measuring portion of the second conduit 8 is preferably located upstream of the inlet 20 of the fourth conduit 18. Each of the conduits 6, 8, 10 and 18 also have a respective control valve 24, 26, 28 and 30 for controlling the flow rate of fluid therethrough. The second control valve 26 of the second conduit 8 is located between the inlet 20 and the outlet 22 of the fourth conduit 18. The second control valve 26 is a high flow rate control valve having a split range positioner and the fourth control valve 30 is a low flow rate control valve having a split range positioner. Examples of the operation of said valves 26, 30 are known in the art and can be found in U. S. Pat. No. 3,169,047. Measurement, computing and control components of the preferred pneumatic type are available from many instrumentation manufacturers, for example The Foxboro Co., Foxboro, Mass. in their Bulletin 13–18D, January 1965. Other equipment is described in U. S. Pat. No. 3,159,345.

Although the measuring-signalling means can be of various construction, one preferred example is an orifice meter 32 operably connected to a flow transmitter 34 which is operably connected to a square root relay 36 for causing a differential pressure in the respective stream, transmitting a signal in response to the differential pressure, calculating the square root of the signal, and delivering a volumetric flow signal responsive thereto. The measuring-signalling means of each of the first, second, third, and fourth conduits 6, 8, 10 and 18 therefore deliver respective signals A, B, C, and D in response to the flow of fluid in said conduits.

A scaling relay 38, such as, for example, a Foxboro Pneumatic Analog Computing Relay, is connected to the measuring-signalling means of the fourth conduit 18 for receiving the signal D therefrom, altering said signal D, and delivering a signal E in response to and representative of said signal D. An example of the alteration of the signal D by the scaling relay 38 would be to mathematically decrease the signal D, which originated at the orifice meter 32 of the fourth conduit 18 through which fluid flows at a relatively low rate, into proper flow rate proportion to the flow rate signal from square root relay 36 of the measuring-signalling means of second conduit 8.

A snap-acting relay 40, such as, for example, a Moore Products Co. Precision Pneumatic Relay Model G.C. 671, is connected to the measuring-signalling means of the fourth conduit 18 for also receiving the signal D therefrom and delivering a signal F in response to said signal D being larger than a preselected value.

A three-way valve 42, such as employed in U. S. Pat. No. 3,169,047, is connected to the measuring-signalling means of the second conduit 8, the scaling relay 38, and, for actuation, to snap-acting relay 40 for receiving signals B, E, and actuating signal F, and selectively passing one of signals B or E in response to the value of signal F, whereby switch-over from one flow measuring assembly to the other is achieved at the maximum flow rate value predetermined for the low flow range stream passed by conduit 18.

By so manipulating the measuring apparatus of this invention, selective diversion of the flow path of the second fuel stream 14 is accomplished and flow rate is measured by equipment of different ranges, the low flow rate signal being made compatible with the high flow rate signal. The flow signal passing through the control equipment, that is, from valve 42, is automatically manipulated in sequence with the diversion of the second fuel stream by way of valves 26 and 30 as will be described below.

A computing relay 44, such as, for example, a Foxboro Pneumatic Analog Computing Relay, is connected to the three-way valve 42 and to the measuring-signalling means of the first conduit 6 for receiving the flow rate signals B or E and A therefrom, computing the total combustible heating value per unit time by the mathematical summation of the products of the fuel gas and off-gas streams 12, 14, each multiplied by its known calorific value, and delivering a total combustible heating value signal G responsive to said computation.

A controller 60 is connected to the computing relay 44 for receiving signal G and a set point J to be described later, comparing said signals, and delivering a signal K responsive to said comparison. First and second sequential relays 62, 64 such as two Foxboro Pneumatic Analog Computing Relays are connected to receive signal K from controller 60. The first sequential relay 62 is connected at its output to a low limit relay 66 of the low rate control valve 30 and to the high rate control valve 26 for selectively controlling said valves 30, 26 responsive to the high range values of the signal K. The second sequential relay 64 is connected to the first valve 24 for controlling the flow of the first stream 12 by valve 24 responsive to low range values of the signal K. By this method and means, valve 24 on low-calorific-value fuel stream 12 is manipulated to a fully open position before valves 30 and 26 begin to open to pass high-calorific-value fuel stream 14 to burner 2 (beyond the low flow rate permitted by valve 30 responsive to the low limit action of relay 66, for pilot light purposes).

A signal C responsive to the combustion air flow, stream 16, is produced by the measuring-signalling means associated with conduit 10 and is transmitted to controller 48, preferably by way of air flow bias relay 50, such as a Foxboro Pneumatic Analog Computing Relay, whereby a bias or set point adjustment I may be made to the air flow measurement. Controller 48 also receives a set point value L (to be described later) and, responsive to a comparison of these two values, produces an output signal which is transmitted via low limit relay 52 to control valve 28 to regulate the air flow rate, according to the set point demand L and bias I, at a value above the low limit flow rate permitted by the action of relay 52 (for pilot light purposes).

Air flow bias relay 50 permits the entry or introduction of an adjustment or modifying signal into the air flow control system for the principal purpose of compensating, manually or automatically, for changes in heating value of the off-gas stream. Such changes may result from differing operating conditions under which the off-gas is generated as in the production of carbon black from heavy oils.

The air stream 16 (conduit 10) is connected to means for thereby controlling the air flow rate in response to a set point signal L and signal C modified by signal I. The fuel streams 12 (conduit 6) and 14 (conduit 8) are connected to means for thereby controlling the flow rates in response to the set point signal J and the computed signal G. Set points J and L are produced from set point signal H which can be delivered from other process equipment, such as the previously mentioned pellet dryer, for example, from its temperature controller. It can alternatively be a manual set point, or other demand signal representative of the total combustible heating value per unit time desired to be supplied by the combined streams 12 and 14.

The means for producing set point signal L for controlling the air stream flow rate can be, for example, a high-select relay 46 connected to computing relay 44 and set point signal H for receiving signals G and H therefrom, comparing said signals, and delivering a signal L substantially equivalent to the higher of said signals G or H in response to said comparison.

Similarly, set point signal J can be produced by selection of the lower of signal H and signal C, modified by a set point signal I, in low select relay 58. Selective relays 46 and 58 and low limit relays 52 and 66 may be found described in Foxboro Bulletin 13-18D referred to above. Relays 46 and 58 each receive two variable input signals while relays 52 and 66 each receive one variable input signal and one manual input signal. Relays 58 and 46 apply safety considerations to the combustion process by requiring the total fuel supply to flow at the minimum of the two rates and the air supply to flow at the maximum of the two rates.

FIG. 2 shows another means for determining the set point signals H and I and applying the described control concepts to a different process. This apparatus and method is particularly useful where the streams 12, 14, 16 are utilized for combustion in the burner of a steam boiler 2' for producing steam having a preselected and desirably constant pressure. In this embodiment, the first and second fuel streams 12, 14 and the air stream 16 are passed into and mixed together in the fuel section 4' of the boiler. The boiler has a feed water stream 3 flowing into the vertical-tube boiler for example, a steam discharge line 5, and a combustion products discharge stack 7 connected to the boiler for respectively replenishing the water in the boiler, directing the produced steam to other apparatus and discharging the resulting combusted gases.

A pressure measuring element 80 is associated with the steam line 5 for measuring the pressure of this stream discharging from the boiler 2'. A pressure transmitter 81 is connected to the pressure measuring element 80 for delivering a signal responsive to the measured steam pressure. A pressure controller 82 having a set point is connected to the pressure transmitter 81 for receiving the signal therefrom, comparing said signal to said set point, and delivering a signal H' responsive thereto for use in producing total combustible heating value set point J and air flow set point L as previously described.

The set point signal I utilized for modifying the air control signal can be a manual set point signal or can be determined, for example, from an analysis of the combusted gases resulting from combustion of the fuel and air streams. As shown in FIG. 2, an analyzer-transmitter 83, preferably an oxygen analyzer such as, for example, a Model 715 Paragraphic Oxygen Analyzer manufactured by Beckman Instruments, Inc., Fullerton, Calif., is associated with the stack 7 by way of sample conduit 9 for measuring at least one constituent of the combusted gases passing therethrough. The analyzer-transmitter 83 delivers a signal responsive to said measurement. The analyzer-transmitter 83 is connected to an analyzer controller 86 which has a set point. The analyzer controller 86 receives the signal from the analyzer transmitter 83, compares said signal to said set point, and delivers a signal I in response to that comparison to bias relay 50 wherein air flow rate measurement C may be modified or biased by suitable addition-subtraction or multiplication-division thereby. The latter is preferred in this example and for computing relay 50 a Foxboro Pneumatic Analog Computing Relay is employed. In this way excess oxygen control is applied to the inventive control system to automatically compensate for changes in heating value of the off-gas stream.

The above described methods of and apparatus for simplified forms of analog computer process control are especially useful in the efficient operation of combustion processes wherein it is desired to fully utilize a low calorific value fuel stream such as carbon black plant off-gas of about 200 BTU per cubic foot before supplementing with more costly fuel gas of about 1,000 BTU per cubic foot heating value. As desired and economic in individual plants, an electrical analog computer control system, or a supervisory digital computer system combined with a direct digital control system, may be employed to perform the mathematical, logical, signal modification-selection and controlling functions described above. The apparatus and methods of this invention permit the automatic control of the three streams in a unique manner for providing improved efficiency.

Other modifications and alterations of this invention will become apparent to those skilled in the art from the foregoing discussion and accompanying drawing, and it should be understood that this invention is not to be unduly limited thereto.

What is claimed is:

1. An apparatus for controlling the flow rates of first and second fuel streams and an air stream, comprising:

first, second, and third separate conduits for passing respective first and second fuel streams and an air stream therethrough;

a fourth conduit having an inlet and an outlet and being connected at said inlet and an outlet in fluid communication with the second conduit at spaced-apart locations along said second conduit;

measuring-signalling means for separately measuring the flow rate through said first, second, third, and fourth conduits and delivering separate signals A, B, C and D in response to the respective measurements and respective flow rates of said stream through said respective conduits, said measuring and signalling means of the second and fourth conduits being different one from the other;

a scaling relay connected to the measuring-signalling means of the fourth conduit for receiving the signal D therefrom, altering said signal D, and delivering a signal E in response to and representative of said received signal D;

a snap-acting relay connected to the measuring-signalling means of the fourth conduit for receiving the signal D therefrom and delivering a signal F in response to said signal F being larger than a preselected value;

a three-way valve connected to the measuring-signalling means of the second conduit, the scaling relay, and the snap-acting relay for receiving the signals B, E and F and selectively passing one of signals B or E in response to the value of signal F;

a computing relay connected to the three-way valve and the measuring-signalling means of the first conduit for receiving respective signals therefrom, computing the total combustible heating value per unit time by the mathematical summation of the products of the first and second fuel streams each multiplied by their calorific value in response to said received signals, and delivering a signal G in response to said computation;

first means for controlling the flow rate of the air stream in response to a set point signal H and signal C;

second means for controlling the flow rate of the first fuel stream in response to the computed signal G and the set point signal H; and control means for selectively passing the second fuel stream through one of the second conduit or the fourth conduit and controlling the rate of flow of the second fuel stream in response to the computed signal G and the set point signal H whereby the measurement of the second fuel stream is selectively measured in response to the flow rate of said second fuel stream and the air stream and first and second fuel streams are controllably combined at rates relative to the set point signal H and the value of signal G.

2. An apparatus, as set forth in claim 1, including an air flow bias relay having a set point signal I and being connected to a measuring-signalling means of the third conduit for receiving the signal therefrom, modifying said signal by said set point signal I and delivering a signal responsive to said modification for controlling the flow rate of the air stream.

3. An apparatus, as set forth in claim 2, including a steam boiler having a feed section and a combustion gas stack and being connected to the first, second, and third conduits for receiving the first and second fuel streams and the air stream, combusting the fuel streams therein, and discharging the resulting gases of combustion through said stack;

an analyzer-transmitter connected to the stack for measuring at least one of the gases flowing through the stack and delivering a signal in response to said measurement; and an analysis controller having a set point and being connected to the analyzer-transmitter and the air flow bias relay for receiving the signal from the analyzer-transmitter, comparing said signal to said set point, and delivering the signal I responsive to said comparison to said air flow bias relay.

4. An apparatus, as set forth in claim 1, including a steam boiler having a feed section and a steam discharge line and being connected to the first, second, and third conduits for receiving the first and second fuel streams and the air stream, combusting the fuel streams therein, and discharging steam through the steam discharge line in response to the heat of the combusting fuels therein;

a pressure measuring element associated with said steam line for measuring the pressure therein;

a pressure transmitter connected to the pressure measuring element for delivering a signal in response to the measured pressure;

a pressure controller having a set point and being connected to the pressure transmitter, the first means, second means, and control means for receiving the signal from the pressure transmitter, comparing said signal to a set point, and delivering a set point signal H in response to said comparison.

5. An apparatus, as set forth in claim 1, wherein the control means comprises:
   a low rate control valve having a split range positioner and being located in the fourth conduit;
   a high rate control valve having a split range positioner and being positioned in the second conduit at a location between the inlet and outlet of the fourth conduit;
   a low-select relay connected to the measuring-signalling means of the third conduit and the set point signal H for receiving the signals C and H, comparing said signals, and delivering a signal J substantially equal to the lower of said signals C and H;
   a controller being connected to the low-select relay and the computing relay for receiving the signals G and J therefrom, comparing said signals and delivering a signal J responsive to said comparison; and
   a sequential relay connected to the controller and the low and high rate control valves for controlling said valves.

6. An apparatus, as set forth in claim 1, wherein the means for controlling the flow rate of the air stream comprises:
   a high-select relay connected to the computing relay and the set point signal H for receiving signals G and H therefrom, comparing said signals, and delivering a signal L substantially equal to the higher of said signals G or H in response to said comparison;
   an air flow controller connected to the high-select relay and the measuring-signalling means of the third conduit for receiving signals L and C, comparing said signals and delivering a control signal responsive to said comparison.

7. A method for controlling the flow rates of first and second fuel streams and an air stream, comprising:
   passing the first fuel stream and the air stream through first and second conduits;
   selectively passing the second fuel stream through one of a second or fourth conduit;
   measuring the flow rates of the streams of each of said first, second, third, and fourth conduits and delivering separate signals A, B, C, and D responsive to the flow rates of said streams through said respective conduits;
   receiving the signal D, altering said signal D and delivering a signal E responsive thereto;
   receiving signals B, E, and F;
   selectively passing one of said signals B or E in response to the value of signal F being larger than a preselected value;
   computing the total combustible heating value per unit time by the summation of the products of the first and second fuel streams each multiplied by their calorific value in response to signals A and F and delivering a signal G responsive to said computation;
   controlling the flow rate of the air stream in response to a set point signal H and signal C;
   controlling the flow rate of the first fuel stream in response to the computed signal G and the set point signal H; and
   selectively passing the second fuel stream through one of the second conduit or the fourth conduit and controlling the rate of flow of the second fuel stream in response to the computed signal G and the set point signal H whereby the measurement of the second fuel stream is selectively measured in response to the flow rate of the second fuel stream and the air stream and the first and second fuel streams are controllably combined at rates relative to the set point signal H and the value of signal G.

8. A method, as set forth in claim 7, including mixing the first and second fuel streams and the air stream in a boiler;
   combusting the mixed stream;
   heating water in the boiler to a temperature sufficient to produce steam;
   discharging steam from the boiler;
   measuring the steam pressure discharging from the boiler;
   delivering a signal in response to said measurement;
   comparing said signal to a set point; and
   delivering the signal H responsive to said comparison.

9. A method, as set forth in claim 7, including modifying signal C by a set point I and delivering a signal responsive to said modification for controlling the flow rate of the air stream.

10. A method, as set forth in claim 9, including mixing the first and second fuel streams and the air streams;
    combusting the mixed streams;
    discharging a combustion gas resulting from the combustion of the mixed streams;
    measuring at least one constituent of the combustion gas;
    delivering a signal in response to said measurement;
    comparing said signal to a set point; and
    delivering the signal I responsive to said comparison.

11. A method, as set forth in claim 7, including receiving signals C and H, comparing said signals, and delivering a signal J substantially equal to the lower of said signals C and H;
    receiving the signals G and J, comparing said signals and delivery a signal K in response to said comparison; and
    controlling the passage of the second fuel stream through one of the second or fourth conduits in response to said signal K.

12. A method, as set forth in claim 7, including receiving signals G and H, comparing said signals, and delivering a signal L substantially equal to the higher of said signals G and H in response to said comparison; and receiving signals L and C, comparing said signals, and delivering a control signal responsive to said comparison for controlling the flow rate of the air stream.

* * * * *